Oct. 27, 1925.
J. W. DAVIS
1,559,409
CIRCUIT CLOSER MOUNTING
Filed Dec. 10, 1924  2 Sheets-Sheet 1
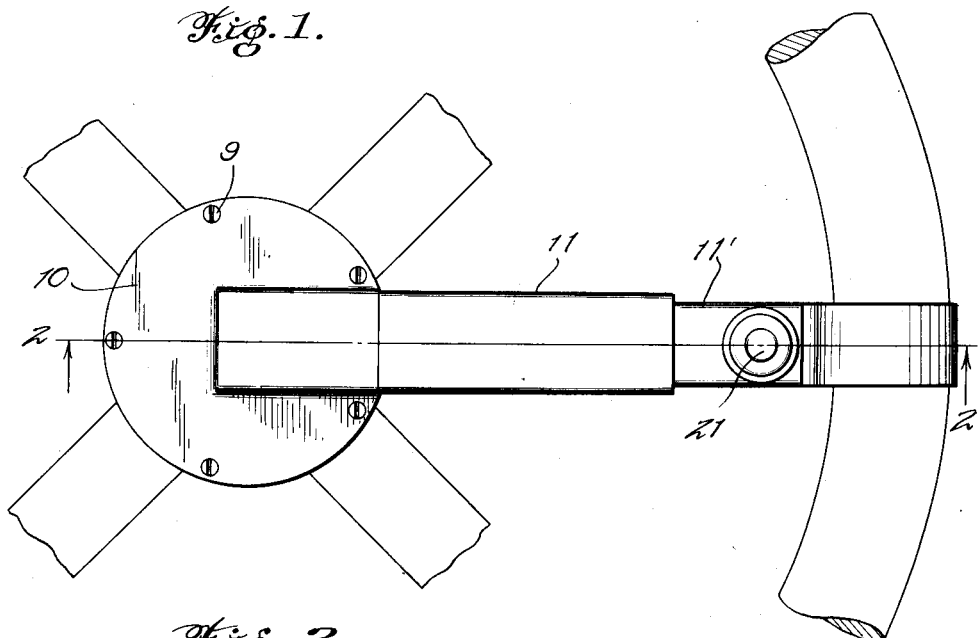
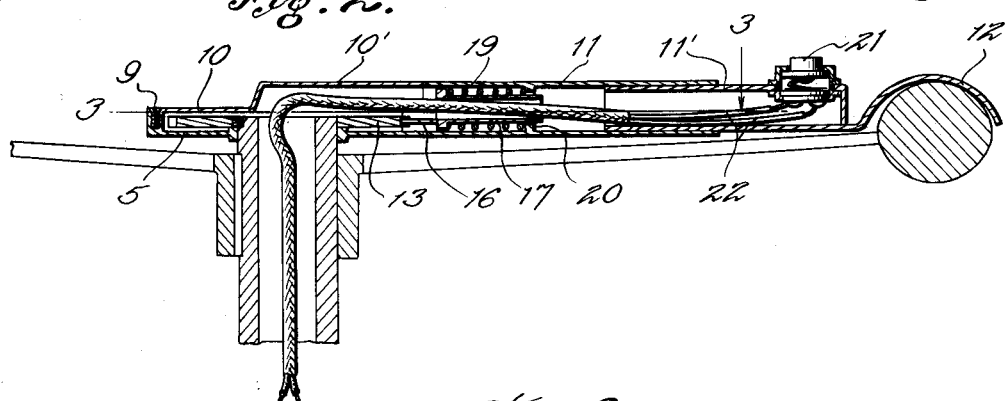
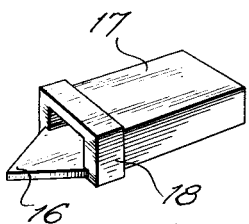
Joshua W. Davis
INVENTOR
BY Victor J. Evans
ATTORNEY
WITNESS:

Oct. 27, 1925.

J. W. DAVIS 1,559,409

CIRCUIT CLOSER MOUNTING

Filed Dec. 10, 1924    2 Sheets-Sheet 2

Joshua W. Davis
INVENTOR

BY Victor J. Evans
ATTORNEY

WITNESS:

Patented Oct. 27, 1925.

1,559,409

UNITED STATES PATENT OFFICE.

JOSHUA W. DAVIS, OF SUMTER, SOUTH CAROLINA.

CIRCUIT-CLOSER MOUNTING.

Application filed December 10, 1924. Serial No. 755,111.

*To all whom it may concern:*

Be it known that I, JOSHUA W. DAVIS, a citizen of the United States, residing at Sumter, in the county of Sumter and State of South Carolina, have invented new and useful Improvements in Circuit-Closer Mountings, of which the following is a specification.

My invention is a circuit closer mounting and its principal object is to provide a circuit closer mounting for automobile steering wheels, which may be operated without removing the operator's hands from the steering wheel.

A further object of the invention is to provide a circuit closer for automobile signals which can be adjusted to any point on the steering wheel and locked in such position.

Still another object of the invention is to provide a circuit closer mounting for automobile steering wheels which is axially adjustable about the steering wheel and also serves to house the various conductors employed in the electrical circuit.

With the preceding and other objects and advantages in mind, the invention consists in the novel combination and arrangement of elements, construction and operations to be hereinafter specifically referred to, claimed and illustrated in the accompanying drawings, wherein:

Figure 1 is a fragmentary top plan view of an automobile steering wheel equipped with the invention.

Figure 2 is a longitudinal sectional view taken on line 2—2 of Figure 1.

Figure 6 is a perspective of the detent or pawl embodied in the invention.

Figure 3:
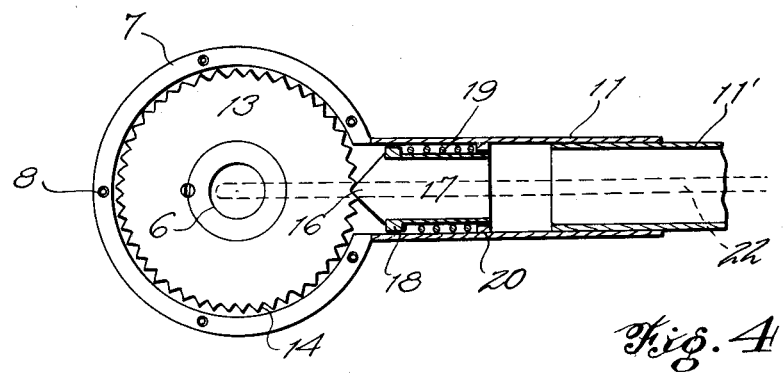
Figure 3 is a horizontal sectional view taken on line 3—3 of Figure 2.
Figure 4:
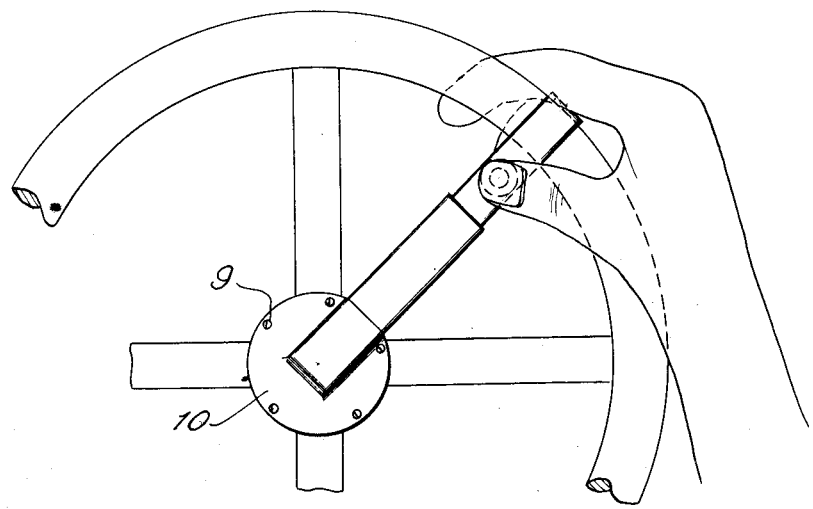
Figure 4 is a fragmentary top plan view of the steering wheel having the invention associated therewith and showing the same in the act of being adjusted.
Figure 5:
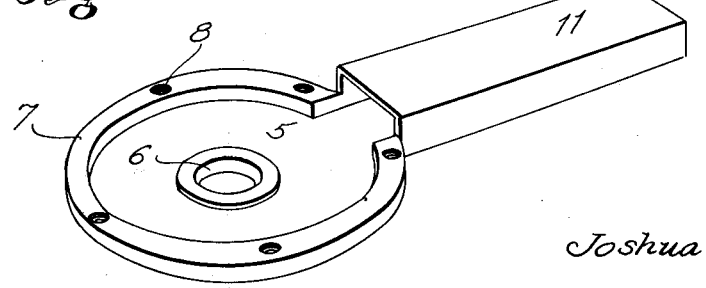
Figure 5 is a perspective of part of the invention.

Referring to the drawing in detail wherein corresponding characters of reference denote corresponding parts throughout the several views, the numeral 5 designates a circular plate having a central opening 6 through which the automobile steering post loosely extends as shown in Figure 2. This plate 5 is provided with an annular shoulder 7 at its outer edge which is provided with a series of openings 8 for the reception of fastenings 9 passing through a cover plate 10 arranged on this shoulder. Extending laterally from the plate 5 at its outer edge is a rectangular in cross section tube 11 which telescopically receives a hollow rectangular in cross section arm 11', the latter being provided with a transversely curved finger engaging extension 12 which seats upon the steering wheel rim as illustrated. This extension 12 in addition to constituting a finger engaging element for the purpose of adjusting the plate 5 axially about the steering post serves to hold the arm 11 against longitudinal movement.

The cover plate 10 is provided with a raised channel shaped member 10' which abuts the inner end of the tube 11.

A disk 13 is fixed to rotate with the steering post and is disposed between the disk 5 and the cover 10. This disk 13 is provided with a serrated toothed edge 14 engaged by a detent or pawl 16 formed on a rectangular tubular element 17 slidably mounted in the inner end of the tube 11. This tubular element 17 is provided with a shoulder 18 which entirely surrounds the same and is engaged by a rectangular expansible spring 19 encircling this tubular element 17. A shoulder 20 is formed upon the inner face of the tube 11 against which one end of the spring 19 abuts.

A conventional push button 21 is carried by the outer end of the arm 11' and is located at a convenient point with respect to the steering wheel rim so as to permit the operator to extend his thumb inwardly to operate the same. Electrical conductors 22 are connected with the push button 21 and pass longitudinally through the arm 11', tube 11 and to the steering wheel post as shown in Figure 2.

From the disclosure it will be observed that as the steering wheel post is rotated the disk 14 revolving therewith causes the arm 11' to swing therewith due to this arm being locked to the disk by a spring urged detent 16. When it is desired to adjust the arm 11' to steering wheels of various diameters, this arm is adjusted longitudinally of the tube to the required point. The finger engaging member 12 bracing the steering wheel rim holds the arm against longitudinal displacement after it has been set in an adjusted position.

While I have shown and described the preferred embodiment of the invention, it should be understood that changes in the construction and arrangement of parts may be made and that I am only limited by the appended claims.

What is claimed is:—

1. The combination with a steering wheel and its post, of a casing loosely supported on the post, a tube extending from the casing, an expansible hollow arm telescopically engaged with the tube, a circuit closer carried thereby and arranged in close proximity to the rim of the wheel, a serrated disk fixed to the steering wheel post and arranged within the casing and a spring urged detent in the tube and engaging the serrated disk whereby to lock the arm thereto.

2. An attachment for steering wheels comprising a casing adapted to be loosely mounted on the steering wheel post, a disk rotatable with respect to the casing and adapted to be fixed to the steering wheel post, a tube extending laterally from the casing, a longitudinally adjustable arm telescopically engaged with the tube, a circuit closing device carried thereby, a tubular member longitudinally movable in the tube, a detent carried thereby and engageable with the serrated disk, shoulders on the inner face of the tube and the outer face of the tubular element, expansible coil springs engaging the shoulders and normally urging the detent into engagement with the serrated disk.

In testimony whereof I affix my signature.

JOSHUA W. DAVIS.